United States Patent Office 2,847,404
Patented Aug. 12, 1958

2,847,404

HIGH STABILITY LATICES

Joseph Bruce Hoertz, Cuyahoga Falls, Ohio, assignor to The B. F. Goodrich Company, New York, N. Y., a corporation of New York No Drawing. Application June 30, 1955
Serial No. 519,262

11 Claims. (Cl. 260—80)

This invention relates to stable synthetic latices and relates more specifically to stable emulsifier-free latices of polymerized monomeric materials which latices also are substantially free of metal ions, particularly alkali metal ions, and to methods for making the same.

It has been believed for many years that latices of polymerized monomers which did not contain soaps and similar emulsifiers would have many advantages over the presently known synthetic polymer latices which contain emulsifiers; and that such latices could be used in many applications which at present are unsatisfactorily achieved through the use of the known synthetic latices which contain emulsifiers. The literature contains reference to emulsifier-free synthetic latices, particularly those of butadine-1,3 polymers, but such latices are extremely difficult to prepare, require precise control even under laboratory conditions and as such are not adaptable to large scale production methods. The latices also have poor stability, and it has not been possible up to now to produce such stable latices of a high total solid content as is required for most latex applications. Further, such latices ordinarily contain alkali metal ions which are undesirable for many applications.

This invention now provides stable emulsifier-free latices which are also free of alkali metal ions, and are substantially free of all metal ions except as may be desired for purposes set forth hereinafter, only a trace, a few parts per million, of group VIII metal ions; and methods for making such latices. In the practice of this invention, a monomer or a mixture of monomers polymerizable in water by free radical mechanisms, at least one of which is partly soluble in water, are added to water containing ammonium persulfate and sulfur dioxide, which latter two materials may be added in total or proportioned as desired, and this mixture is polymerized while being agitated. Latices which are emulsifier-free and alkali metal ion-free are prepared which have a total solids content as high as about 50%, depending upon the amount of water in the mixture. These latices are extremely stable to chemical and mechanical influences and may be readily concentrated to higher total solids content. Polymer films and products obtained from these latices have extremely excellent resistance to water. The polymers laid down from the latices of this invention have unique and outstanding adhesive properties, quite unexpectedly superior to those of the normal emulsifier and alkali metal ion-containing latices, and latices which are low in concentration of emulsifier prepared by other processes. Further, these latices are compatible with other latices which may or may not contain emulsifier and they are particularly compatible with liquid phenolic resins.

The process of this invention is applied as has been set forth hereinabove to monomers and monomer mixtures containing at least one monomer which is soluble to some extent in water. Preferably, of the total amount of monomers used in any one aqueous polymerization recipe there should be dissolved in the water greater than about 0.5% of monomers at 25° C., and preferably about 1%. For example, acrylonitrile is soluble in water at room temperature to the extent of about 7.2% so that monomer mixtures containing acrylonitrile as a component can contain as small an amount as about 7% acrylonitrile, and preferably about 15% acrylonitrile, even if none of the other monomers are water-soluble. Thus, when polymerizing by the process of this invention a monomer mixture containing butadiene, styrene and acrylonitrile, it is preferred that the mixture contain about 10% acrylonitrile. Ethyl acrylate has a water solubility of about 1.5% and thus may be used alone or in admixture with other water-insoluble monomers if about one-third of the monomer mixture is ethyl acrylate. A mixture of 80 parts butadiene-1,3, 6 parts acrylonitrile and 15 parts of ethyl acrylate, for example, is a useful mixture of which about 0.68 part (0.68%) is soluble in water. Other useful water-soluble monomers include, for example, methyl acrylate, about 5%; methyl methacrylate, about 1.5%; vinyl acetate, about 2.4%; methacrylonitrile, about 2.7%; acrylic acid, methacrylic acid and acrylamide which are quite soluble in water, methacrylamide; methyl vinyl ether, about 1.5%, ethyl vinyl ether, about 0.9%, vinyl-2-methoxyethyl ether, about 8.8%; methyl vinyl ketone, all proportions, ethyl vinyl ketone, about 3%, methylisopropenyl ketone, about 5%; acrolein; and the like.

The method of the invention is further applicable generally to the polymerization of the defined monomer mixtures of unsaturated compounds containing the $H_2C=C<$ group, that is, vinylidene compounds or compounds containing a terminal methylene group attached by a double bond to a carbon atom. Examples of such compounds include vinylidene compounds containing only one carbon-to-carbon unsaturated bond such as vinyl chloride; vinyl acetate; vinylidene chloride; vinyl fluoride; dichlorodifluoroethylene; vinyl acetate; the styrenes and polymerizable styrene derivatives including alpha-substituted styrenes such as alphamethyl styrene, nuclear substituted styrenes such as vinyl toluene, the chlorostyrenes, alkoxystyrenes such as methoxystyrene and the like; acrylonitrile, methacrylonitrile and chloroacrylonitrile; acrylic and methacrylic acids, the alkyl acrylates and methacrylates; the alkyl vinyl ethers and alkyl vinyl ketones; the acrylamides; vinyl pyridine; vinyl benzoate and other similar monoolefinic compounds polymerizable by a free radical mechanism in aqueous systems. Other vinylidene compounds containing more than one unsaturated linkage include the conjugated-dienes such as butadiene-1,3, isoprene, dimethyl butadiene and the like as well as myrcene; and compounds containing olefinic and acetylic bonds such as vinyl acetylene, vinyl diethenyl carbonyl and the like. It will be understood that the vinyl compounds are a species of vinylidene compounds since they contain characteristic $$CH_2=\overset{|}{C}H \text{ groups}$$

one of the valences being connected to H to form vinyl groups. Preferred in the practice of this invention are monomer mixtures containing a conjugated diene such as butadiene-1,3 or isoprene and one or more vinyl compounds, at least one of which is partly water-soluble. These monomer mixtures result ordinarily in latices containing polymerized products which will deposit elastic films. For example, monomer mixtures containing greater than 30% of butadiene, such as 50% butadiene-1,3, at least one of acrylonitrile or methacrylonitrile, and methyl or ethyl acrylate and like monomers of the required degree of water-solubility; and one or more other alkyl acrylates, alkyl methacrylates, styrene and polymerizable styrene derivatives such as are described in A. C. S. monograph No. 115, "Styrene" including alpha-methyl styrene, vinyl toluene, the chloro- and alkoxy-styrenes and the like; vinyl pyridine, vinylidene chloride and the like, are employed to make latices particularly valuable in applications to leather, paper fabrics, glass and the like.

The catalyst or initiator employed in the practice of this invention is ammonium persulfate together with sulfur dioxide. The use of sulfur dioxide is essential to the practice of this invention. The total amount of catalyst employed ordinarily may be varied from about 0.1 to 3.0 weight parts of each of ammonium persulfate and sulfur dioxide per 100 weight parts of monomers. Preferably an amount of each from about 0.5 to 2.0 weight parts are employed. The optimum molar ratio of sulfur dioxide to ammonium persulfate is about 2 to 1 for the fastest polymerization rates and about 4 to 1 for the most stable latex. These proportions may be varied as desired from a ratio of about 1 to 2 to 10 to 1. If too small an amount of sulfur dioxide is employed, latices of decreased stability are obtained. If too large a quantity of sulfur dioxide is employed, coagulum may appear during the course of the polymerization. Ordinarily a ratio of about 1 weight part of ammonium persulfate to 1 weight part of sulfur dioxide will be found most useful. These two catalyst materials may be proportioned during the course of the polymerization either separately, at the same time or either one alone. Ordinarily the better practice is to dissolve the ammonium persulfate in water, add the sulfur dioxide and then polymerize at the desired polymerization temperature.

If it is desired to increase the rate of reaction at a given temperature or to cause polymerization to take place at a normal rate at lower temperatures, a trace of a group VIII metal ion, preferably iron, in the form of water-soluble salt, or less desirably, in the form of a less soluble salt which is soluble to the extent to maintain the required concentration of metal ions, may be added to the polymerization mixture initially or during the course of the polymerization. Use of iron ions is not essential other than for obtaining more rapid reaction rates, and may be omitted for applications requiring an absolutely metal ion-free latex. For most latex applications the presence of a trace of these metal ions can be tolerated and in such instances it is preferable to employ from about $1 \times 10^{-4}$ to about $10 \times 10^{-4}$ weight parts of iron ions derived from a water-soluble ferrous or ferric salt, as can be determined by referring to a Chemistry Handbook, per 100 weight parts of monomers. More preferably an amount of ferrous ion is employed from about $4 \times 10^{-4}$ to about $8 \times 10^{-4}$ parts. Iron acetates, halides, sulfates, nitrates and the like are soluble in water and are quite suitable. It is essential to obtain the valuable latices of this invention that alkali metal ions be rigorously excluded.

In those cases where a trace of iron is employed to speed up the reaction it is often desirable to add the iron during the course of the polymerization, preferably after about 25% conversion of monomers to polymer has occurred. As often is the case though, this is not convenient or expedient and it may be desired to add the iron initially. In such cases, because of the variation in agitation and different sizes and types of polymerizers, varying initial reaction rates are often obtained. A novel expedient to eliminate such variation is the use of a small amount of oxygen which controls the initial reaction and results in a polymerization with an overall uniform reaction rate. It is difficult to add oxygen accurately either as the gas or in air to a polymerization vessel and a more useful expedient is to add a small amount of hydrogen peroxide. The amount of hydrogen peroxide employed may be varied from about 0.05 to 0.3 weight parts, and more preferably from about 0.1 to 0.2 weight parts, of 30% hydrogen peroxide per 100 weight parts of monomers. It is unexpected that in this system, the use of a small amount of hydrogen peroxide slows down the initial reaction rate of monomers initiated by ammonium persulfate and sulfur dioxide in the presence of a trace of ferrous ions.

The preparation of typical latices of this invention will be found in the following examples which are given to illustrate the practice of the invention and to more clearly demonstrate its embodiments. All parts are parts by weight.

Example I

The following materials are charged to a stirred pressure autoclave: 1 part of ammonium persulfate dissolved in 200 parts of water, a mixture of 67 parts of butadiene-1,3, 33 parts of acrylonitrile, 0.5 part of a tertiary $C_{12}$ mercaptan, $6 \times 10^{-4}$ parts of ferrous iron as ferrous ammonium sulfate hydrate, 0.2 part of 30% hydrogen peroxide and 1 part of sulfur dioxide. This mixture is stirred while being heated to 50° C., and a conversion of monomers to polymer of 93% is obtained in 6 hours to form a stable latex of about 31% total solids. When this same polymerization is repeated in the absence of the small trace of iron and hydrogen peroxide, a conversion of about 85% is reached in 25 hours. When ferrous iron is used in the absence of hydrogen peroxide, a conversion of about 90% is obtained in about three hours. These latex products also are stable latices having total solids contents of about 30%. These latices are very stable to mechanical agitation.

Example II

A monomer mixture of 35 parts of butadiene-1,3, 35 parts of styrene and 30 parts of acrylonitrile is prepared by adding to the reactor 1 part of ammonium persulfate dissolved in 95 parts of water, 100 parts of the monomer mixture in the ratio set forth above, 0.5 weight part of a tertiary $C_{12}$ mercaptan and $6 \times 10^{-4}$ parts of ferrous ion as ferrous ammonium sulfate are added to a large, stirred, pressure reactor. The mixture is heated to about 65° C. and one part of sulfur dioxide then added. Polymerization occurs readily and a conversion of monomers to polymer of greater than 90% is obtained in about 25 hours. A stable latex is obtained containing about 50% solids. This latex has improved mechanical, chemical and freeze-thaw stability as compared to latices containing emulsifiers and/or alkali metal ions. Films of the polymer from this latex have excellent water resistance as compared to latices containing emulsifiers and/or alkali metal ions. Outstanding are the adhesive properties of films from this latex. Excellent adhesion is obtained to metal, glass and fabrics of nylon, rayon and cotton. The latices are stable to the addition of acetic acid and have excellent compatibility with liquid phenolic resins.

One-half part of a non-ionic surface-active agent such as the condensation product of nonyl phenol and ethylene oxide is dissolved in the above latices. Addition of 25 ml. of a 10% aqueous solution of calcium chloride to 100 grams of latex does not cause formation of coagulum. These latices containing non-ionic surface-active agents will also withstand four freeze-thaw cycles (16 hours at −18° C. and 8 hours at room temperature) before any coagulum forms. When one part of the non-ionic surface-active agent is employed there is no coagulum even after 13 freeze-thaw cycles. Further, the presence of one part of these surface-active agents has no adverse effect on the adhesion of polymer deposited from these latices onto rayon monofilaments. Latices containing the non-ionic surface-active agent may be readily concentrated to total solids content of 55 to 60%.

The addition of a small amount of a non-ionic surface-active agent to these and other latices of this invention improves the mechanical, chemical and freeze-thaw stability to an outstanding degree and this is accomplished through the use of small amounts of these surface-active agents which does not introduce alkali metal ions. The non-ionic surface-active agents for this use are water-soluble partial esters of highly polymerized glycerol, hydroxyalkyl esters of glycerol, sorbitol or mannitol and, more preferably, esters of long-chain polyethylene glycols, such as the condensation products of phenolic compounds with ethylene oxide. The addition of only a small amount of these materials improves these latices so that they are stable to the use of calcium chloride, sulfuric and hydrochloric acid and extended freeze-thaw cycles. Quite unexpectedly, the presence of small amounts of these surface-active agents has no adverse effect on the adhesion properties of polymers deposited from these latices on such materials as rayon and the like. About 0.1 to about 3 parts may be used.

*Example III*

One part of ammonium persulfate is dissolved in 200 parts of water. A monomer mixture containing 72 parts of butadiene, 16 parts of styrene and 12 parts of acrylonitrile is prepared and 0.5 part of a tertiary $C_{12}$ mercaptan and $6 \times 10^{-4}$ part of ferrous ions in the form of ferrous ammonium sulfate hydrate are added to the water in a stirred pressure autoclave. The stirred mixture is heated to about 50° C. and one part of sulfur dioxide added thereto. At the end of about 12 hours the pressure in the polymerizer has dropped to less than 6 p. s. i. and a stable latex containing a total solids content of 31% is obtained.

*Example IV*

200 parts of water containing one part of ammonium persulfate are charged to a stirred pressure autoclave, a monomer mixture of 50 parts of butadiene and 50 parts of methacrylic acid containing 0.5 part of a tertiary $C_{12}$ mercaptan, and $6 \times 10^{-4}$ part of ferrous ion in the form of ferrous ammonium sulfate is added thereto, and the stirred mixture heated to about 50° C. One part of sulfur dioxide is then added to the stirred mixture and polymerization occurs readily to form a stable latex containing about 33% total solids in about 12 hours.

*Example V*

200 parts of water containing one part of ammonium persulfate dissolved therein is added to a stirred pressure autoclave. A monomer mixture of 65 parts of ethyl acrylate, 33 parts methyl methacrylate and 2 parts of methacrylic acid, and $6 \times 10^{-4}$ ferrous ions in the form of ferrous ammonium sulfate are added to the polymerizer and the mixture heated to about 35° C. One part of sulfur dioxide is added to the mixture which polymerizes rapidly and at the end of about one hour a stable latex containing 32% total solids is obtained. When the above example is repeated with a monomer mixture of 33 parts butadiene-1,3, 33 parts acrylonitrile and 33 parts ethyl acrylate at 50° C. the mixture polymerizes to 98% conversion in 2½ hours to give a 33% total solid latex.

*Example VI*

153 parts of water, 1 part of ammonium persulfate, 12 parts of acrylonitrile, 60 parts of styrene and 28 parts of butadiene are charged to a reaction vessel which is closed and agitation begun while heating the mixture to about 65° C. While the mixture is being agitated and heated, one part of sulfur dioxide, 0.5 part of tertiary $C_{12}$ mercaptan and $6 \times 10^{-4}$ part of ferrous ion as ferrous ammonium sulfate hydrate are added thereto. At the end of less than about five hours the pressure in the reactor is reduced to 0 and a stable latex having a total solids content of about 40% is obtained. The initial pressure in the reactor is about 45 pounds per square inch at 65° C. When this recipe is repeated using 95 parts of water, a stable latex containing about 50% total solids is obtained. The 40% total solids latex can be readily concentrated to about 50 to 52% total solids by heating under a vacuum. These latices are quite useful in paint formulations and in preparation of superior leather finish compositions. Films deposited from the latex are exceedingly strong, tear resistant, materials which are quite water-insensitive. Polymer deposited from this latex has excellent adhesion properties.

A preferred basic recipe for the preparation of a large variety of emulsifier-free alkali metal ion-free latices is as follows:

| Materials: | Weight parts |
|---|---|
| Monomers | 100.0 |
| Water | 100–200 |
| Ammonium persulfate | 1.0±0.5 |
| Sulfur dioxide | 1.0±0.5 |
| Ferrous ions | $4$–$8 \times 10^{-4}$ |

It is generally desirable to also include from about 0.1 to about 1.5 or 3.0 parts of a mercaptan modifier. Less than about 2 parts of mercaptan modifiers containing about 3 to 18 carbon atoms may be employed with better results being obtained from those containing about 4 to 12 carbon atoms. The most useful mercaptans are the tertiary $C_{12}$ mercaptans. The concentration of water in the recipe may be varied from about 100 to about 200 parts depending upon the final total solids content desired in the latices. Use of this recipe results in stable, valuable, useful latices including, for example, latices of monomer mixtures of vinyl chloride and ethyl acrylate, styrene and acrylonitrile, styrene and ethyl acrylate, vinyl chloride and vinyl acetate, vinylidene chloride and acrylonitrile and the like. Increment addition of sulfur dioxide and/or ammonium persulfate may be used to maintain or speed-up polymerization and if necessary, increment addition of trace amounts of iron ions in the form of water-soluble salts will maintain polymerization without increasing the electrolyte content of the latex measurably. The temperature of polymerization may be varied quite broadly from about 5° C. to about 65° C. or higher as preferred. Polymerization temperatures of about 35° C. are preferable for most systems. The degree of polymerization may be varied as desired but ordinarily is from about 60% to complete conversion of monomers to polymer. The latices of the invention may be concentrated to total solids greater than that obtained from the polymerization, and to an even greater degree if a small amount of a non-ionic surface-active agent is added thereto, less than about one part, by means of the usual latex concentrating methods. Although the examples given herein are batch polymerizations, the processes of this invention are applicable to continuous systems.

Although embodiments of the invention have been specifically described it is not desired or intended that the invention be limited solely thereto as it will be apparent to those skilled in the art that modifications and variations may be made without departing from the spirit and scope of the invention as defined in the appended claims.

I claim:

1. The method for preparing stable, emulsifier-free, alkali metal ion-free latices of polymerizable monomers which comprises polymerizing in water 100 parts of a monomeric mixture comprising greater than 30% conjugated dienes and at least one other vinylidene compound containing the $H_2C{=}C{<}$ group, at least one of which said vinylidene compound monomers is present in the monomeric mixture in an amount so that at least about 0.5% of said vinylidene monomers are dissolved in water, in the presence of about 0.1 to 3 parts of ammonium persulfate and about 0.1 to 3 parts of sulfur dioxide, in the absence of emulsifiers and alkali metal ions and in the presence of about $1 \times 10^{-4}$ to $10 \times 10^{-4}$ part of iron ions.

2. The method for preparing stable, emulsifier-free, alkali metal ion-free latices of polymerizable monomers which comprises polymerizing in water 100 parts of a monomeric mixture of greater than 30% conjugated dienes and at least one other vinylidene compound containing the $H_2C{=}C{<}$ group, at least one of which said vinylidene compounds is present in the mixture in an amount so that at least 1% of said vinylidene compounds are dissolved in water, in the presence of about 0.5 to 2 parts of ammonium persulfate, about 0.5 to 2 parts of sulfur dioxide and about $1 \times 10^{-4}$ to $10 \times 10^{-4}$ part of iron ions, in the absence of emulsifiers and alkali metal ions.

3. The method for preparing stable, emulsifier-free, alkali metal ion-free latices of polymerizable monomers which comprises polymerizing in water 100 parts of a monomeric mixture comprising greater than 30% conjugated dienes and at least one other vinylidene compound containing the $H_2C=C<$ group, at least one of which said vinylidene compound monomers is present in the mixture in an amount so that at least 1% of said vinylidene compounds are dissolved in water, in the presence of about 0.1 to 3 parts of ammonium persulfate, about 0.1 to 3 parts of sulfur dioxide, $1 \times 10^{-4}$ to $10 \times 10^{-4}$ of iron ions and about 0.05 to 0.3 part of 30% hydrogen peroxide, in the absence of emulsifiers and alkali metal ions.

4. The method for preparing stable, emulsifier-free, alkali metal ion-free latices which comprises polymerizing in water 100 parts of a monomer mixture comprising greater than 30% butadiene-1,3, acrylonitrile and at least one other vinylidene compound containing the $H_2C=C<$ group polymerizable therewith, said acrylonitrile and other vinylidene compound being present in an amount so that at least 0.5% of said two monomers are dissolved in water, in the presence of about one part of ammonium persulfate, about one part of sulfur dioxide and about $4 \times 10^{-4}$ to $8 \times 10^{-4}$ part of ferrous ions, in the absence of emulsifiers and alkali metal ions.

5. A stable, emulsifier-free, alkali metal ion-free latex prepared by the method of claim 1.

6. A stable, emulsifier-free, alkali metal ion-free latex prepared by the method of claim 2.

7. A stable, emulsifier-free, alkali metal ion-free latex prepared by the method of claim 3.

8. A stable, emulsifier-free, alkali metal ion-free latex prepared by the method of claim 4.

9. The method for preparing stable, emulsifier-free, alkali metal ion-free latices of polymerizable monomers which comprises polymerizing in water 100 parts of monomeric mixture comprising greater than 30% conjugated dienes and at least one other vinylidene compound containing the $CH_2C<$ group, at least one of which said other vinylidene compound is present in the monomeric mixture in an amount so that at least about 1% of said other vinylidene compound is dissolved in water, in the presence of about 0.5 to 2 parts ammonium persulfate and about 0.5 to 2 parts of sulfur dioxide, in the absence of emulsifiers and alkali metal ions and in the presence of about $1 \times 10^{-4}$ to $10 \times 10^{-4}$ part of iron ions.

10. The method of claim 9 wherein the monomeric mixture contains a major proportion of a conjugated diolefin.

11. A stable, emulsifier-free, essentially metal ion-free latex prepared by the method of claim 9.

References Cited in the file of this patent

UNITED STATES PATENTS

| | | |
|---|---|---|
| 2,296,403 | Renfrew et al. | Sept. 22, 1942 |
| 2,380,473 | Stewart | July 31, 1946 |
| 2,462,354 | Brubaker et al. | Feb. 22, 1949 |
| 2,586,124 | Amerongen | Feb. 19, 1952 |
| 2,663,747 | Ten Have | Dec. 22, 1953 |

OTHER REFERENCES

Noble: Latex in Industry, 2nd ed., Rubber Age (1953), New York, pp. 146–7.